(12) United States Patent
Wada

(10) Patent No.: US 8,848,107 B2
(45) Date of Patent: Sep. 30, 2014

(54) VIDEO TRANSMISSION APPARATUS, VIDEO DISPLAY APPARATUS, VIDEO TRANSMISSION METHOD AND STORAGE MEDIUM, AND VIDEO DISPLAY METHOD AND STORAGE MEDIUM

(71) Applicant: Canon Kabushiki Kaisha, Tokyo (JP)

(72) Inventor: Asuka Wada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/920,699

(22) Filed: Jun. 18, 2013

(65) Prior Publication Data

US 2013/0342761 A1   Dec. 26, 2013

(30) Foreign Application Priority Data

Jun. 20, 2012  (JP) ................ 2012-138387

(51) Int. Cl.
*H04N 5/14* (2006.01)
*H04N 9/64* (2006.01)
*H04N 5/66* (2006.01)
*H04N 9/12* (2006.01)
*H04N 5/38* (2006.01)
*G09G 5/00* (2006.01)

(52) U.S. Cl.
CPC ... *H04N 5/38* (2013.01); *G09G 5/00* (2013.01)
USPC .............. 348/571; 348/576; 348/739

(58) Field of Classification Search
CPC .......... H04N 5/38; H04N 5/14; H04N 5/208; H04N 5/4403; H04N 17/04
See application file for complete search history.

(56) References Cited

U.S. PATENT DOCUMENTS

| | | | |
|---|---|---|---|
| 2006/0132656 A1* | 6/2006 | Yamamoto et al. | 348/571 |
| 2009/0219441 A1* | 9/2009 | Kurita | 348/571 |
| 2010/0053441 A1* | 3/2010 | Tokashiki et al. | 348/576 |

FOREIGN PATENT DOCUMENTS

JP   2010-124391 A   6/2010

* cited by examiner

*Primary Examiner* — Jefferey Harold
*Assistant Examiner* — Sean Haiem
(74) *Attorney, Agent, or Firm* — Canon U.S.A., Inc. IP Division

(57) ABSTRACT

A video transmission apparatus includes a video data transmission unit configured to transmit video data to an external apparatus, an image quality parameter acquisition unit configured to acquire an image quality parameter to be used for display of the video data, an image quality parameter generation unit configured to generate, from the image quality parameter acquired by the image quality parameter acquisition unit, image quality parameter information to be used in the external apparatus, and an image quality parameter transmission unit configured to transmit the image quality parameter information generated by the image quality parameter generation unit to the external apparatus.

16 Claims, 15 Drawing Sheets

FIG. 4

| IMAGE QUALITY PARAMETER TYPE G | SETTING VALUE $V_{GS}$ OF IMAGE QUALITY PARAMETER | REFERENCE VALUE $V_{GSBase}$ OF IMAGE QUALITY PARAMETER SETTING |
|---|---|---|
| HUE_RED | 55 | 50 |
| HUE_GREEN | 57 | 52 |
| HUE_BLUE | 60 | 50 |
| SATURATION_RED | −10 | 0 |
| ... | | |
| SHARPNESS | 50 | 50 |
| NOISE REMOVAL | 4 | 3 |

FIG. 6

| IMAGE QUALITY PARAMETER TYPE G | MINIMUM VALUE $V_{min}$ OF IMAGE QUALITY PARAMETER | MAXIMUM VALUE $V_{max}$ OF IMAGE QUALITY PARAMETER |
|---|---|---|
| HUE_RED | 0 | 100 |
| HUE_GREEN | 0 | 100 |
| HUE_BLUE | 0 | 100 |
| SATURATION_RED | −100 | 100 |
| ... | | |
| SHARPNESS | 0 | 100 |
| NOISE REMOVAL | 0 | 5 |

FIG. 7

| IMAGE QUALITY PARAMETER TYPE G | APPLICATION VALUE VGScommon OF IMAGE QUALITY PARAMETER |
|---|---|
| HUE_RED | +10% |
| HUE_GREEN | +10% |
| HUE_BLUE | +20% |
| SATURATION_RED | −10% |
| ⋮ | |
| NOISE REMOVAL | +50% |

FIG. 8

```
...
<parameter_list>
 <parameter>
  <name>hue_red</name>
  <value>-20</value>
 </parameter>
 <parameter>
  <name>hue_blue</name>
  <value>-20</value>
 </parameter>
 ...
</parameter_list>
```

| IMAGE QUALITY PARAMETER TYPE $G_d$ | MINIMUM VALUE $V_{min}$ OF IMAGE QUALITY PARAMETER | MAXIMUM VALUE $V_{max}$ OF IMAGE QUALITY PARAMETER | REFERENCE VALUE $V_{base}$ OF IMAGE QUALITY PARAMETER |
|---|---|---|---|
| HUE_RED | −20 | +20 | 0 |
| HUE_GREEN | −20 | +20 | 0 |
| HUE_BLUE | −20 | +20 | 0 |
| SATURATION_RED | −20 | +20 | 0 |
| ... | | | |

1201

VIDEO TRANSMISSION APPARATUS, VIDEO DISPLAY APPARATUS, VIDEO TRANSMISSION METHOD AND STORAGE MEDIUM, AND VIDEO DISPLAY METHOD AND STORAGE MEDIUM

BACKGROUND OF THE INVENTION

1. Field of the Invention

The present invention relates to a video display apparatus, and, more particularly, to a technique for outputting a video of which image quality has been suitably adjusted.

2. Description of the Related Art

In recent years, higher image quality of video display apparatuses represented by a television has been progressing. The image quality of the video display apparatus is determined by a combination of various parameters (hereinafter, referred to as an image quality parameter), such as hue, lightness, saturation, or enhancement degree of contour, which exerts influence on an output video. These image quality parameters are once optimally set up at a shipment stage of a product, but thereafter, they can be often changed directly by a user. Thus, the user becomes able to view videos with a favorite image quality by adjusting the image quality parameters via on-screen display (OSD), which is superimposed on a display screen, or via a remote controller operation.

Further, there are many types of video data input into the video display apparatus to be projected onto a screen or a wall surface, or to be displayed on a panel. The video display apparatus is provided with a plurality of video data input interfaces such as interfaces of High-Definition Multimedia Interface (HDMI), Single Document Interface (SDI), and DisplayPort. Further, video data retrieved from the Internet via a local area network (LAN) has also a diversity of features. A suitable image quality parameter setting exits for each video data, and in addition to this, a desirable image quality parameter setting varies depending on the user.

In order to display videos with the user's favorite image quality on a specific video display apparatus, it becomes necessary to make an individual image quality parameter setting suitable for the user currently using the apparatus. However, for example, in a case where the user operates the video display apparatus for the first time, the user is not accustomed with the operation of the apparatus, and it takes a time for the user to set a desirable image quality parameter. In order to simplify the image quality parameter setting for each user, there is a method for detecting a user's voice, identifying the user based on voice information registered in advance, and performing the image quality parameter setting based on a setting value of the image quality setting, which is also registered in advance for each user (as discussed in Japanese Patent Application Laid-Open No. 2010-124391).

However, since a video display apparatus installed in a shared space such as a conference room is used by an unspecified number of users, it is difficult to register user information in advance or to retain setting values of image quality settings for respective users. On the other hand, in recent years, the number of video display apparatuses individually used by a specific user such as a smartphone or a tablet PC has been increasing. For such an individually-owned video display apparatus, an image quality parameter setting is often made to reflect the user's preference. In particular, in a case where video data to be displayed is transmitted from an individually-owned video display apparatus to a shared video display apparatus, the user's desirable image quality parameter setting for the video data may exist on the individually-owned video display apparatus side. Thus, if the image quality parameter setting on the individually-owned video display apparatus side can be reflected on the shared video display apparatus side, the image quality parameter corresponding to the user or the video data can be simply set on the shared video display apparatus side, and thus can be reflected on output video.

SUMMARY OF THE INVENTION

The present invention is directed to a video display apparatus capable of displaying, on the video display apparatus receiving video data, the video data on which an image quality parameter is reflected, even without setting the image quality parameter by a user.

According to an aspect of the present invention, a video transmission apparatus includes a video data transmission unit configured to transmit video data to an external apparatus, an image quality parameter acquisition unit configured to acquire an image quality parameter to be used for display of the video data, an image quality parameter generation unit configured to generate, from the image quality parameter acquired by the image quality parameter acquisition unit, image quality parameter information to be used in the external apparatus, and an image quality parameter transmission unit configured to transmit the image quality parameter information generated by the image quality parameter generation unit to the external apparatus.

According to another aspect of the present invention, a video display apparatus includes a video data reception unit configured to receive video data from an external apparatus, an image quality parameter reception unit configured to receive image quality parameter information for displaying video data received by the video data reception unit, an image quality parameter generation unit configured to generate, from the image quality parameter information received by the image quality parameter reception unit, an image quality parameter for displaying the video data, and a video display unit configured to display the video data using the image quality parameter generated by the image quality parameter generation unit.

According to an exemplary embodiment of the present invention, in a case where video data to be displayed is transmitted from a video transmission apparatus to a video display apparatus, image quality parameter information is transmitted to the video display apparatus at the same time. The video display apparatus receiving the image quality parameter information outputs the video data on which the image quality parameter information is reflected. Accordingly, the video data on which the image quality parameter is reflected can be displayed on the video display apparatus receiving the video data, without setting the image quality parameter by the user.

Further features of the present invention will become apparent from the following description of exemplary embodiments with reference to the attached drawings.

BRIEF DESCRIPTION OF THE DRAWINGS

FIG. 4 illustrates a storage example of setting information of image quality parameters according to the first exemplary embodiment.

FIG. 6 illustrates a storage example of maximum value/minimum value information of image quality parameters according to the first exemplary embodiment.

FIG. 7 illustrates a storage example of image quality parameter information to be transmitted according to the first exemplary embodiment.

FIG. 8 illustrates an example of a transmission format of image quality parameter information to be transmitted according to the first exemplary embodiment.

FIG. 12 illustrates a storage example of maximum value/minimum value/reference value information of image quality parameters of the video display apparatus according to the first exemplary embodiment.

DESCRIPTION OF THE EMBODIMENTS

Hereinbelow, a first exemplary embodiment of the present invention will be described with reference to the drawings and flowcharts. However, the technical scope of the present invention is not limited to the exemplary embodiments.

Figure 1:
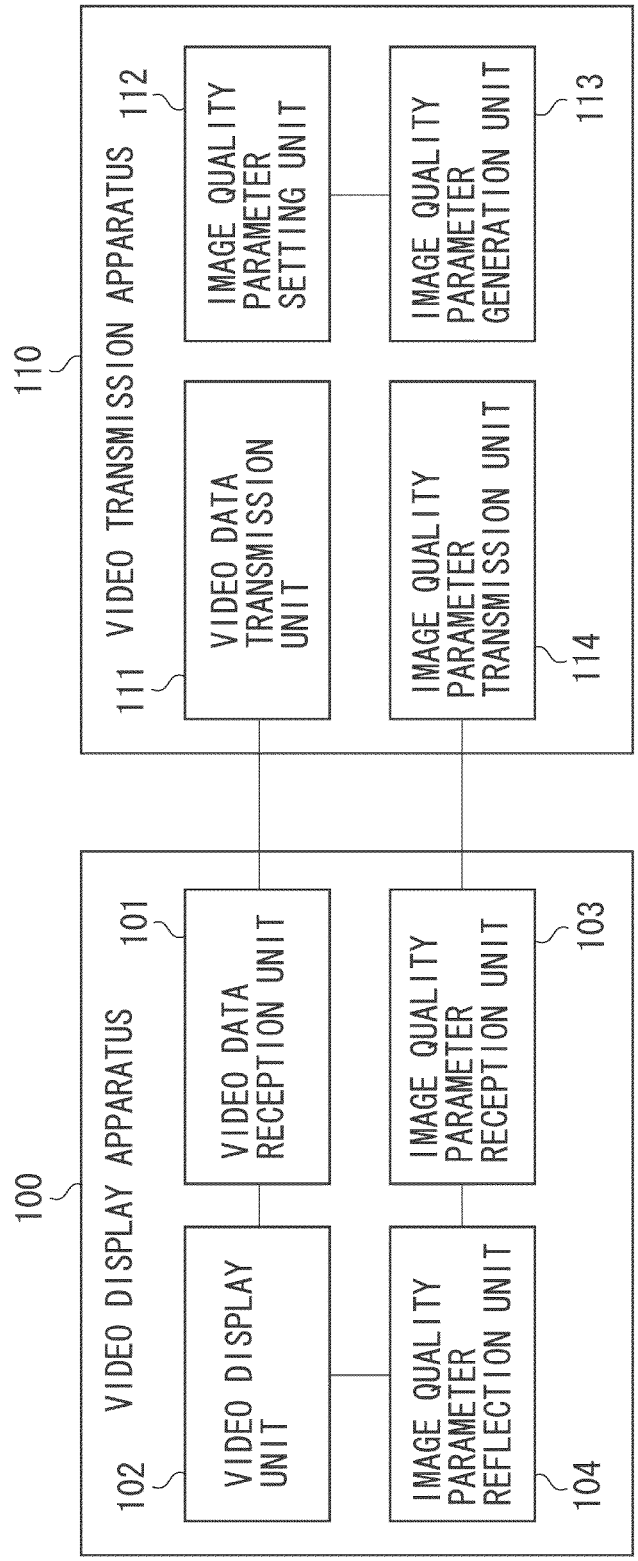
FIG. 1 is a block diagram illustrating configurations of a video display apparatus and a video transmission apparatus according to an exemplary embodiment of the present invention.

FIG. 1 is a block diagram illustrating configurations of the exemplary embodiments of a video display apparatus and a video transmission apparatus of the present invention. In FIG. 1, a video display apparatus 100 receives and displays video data. The video display apparatus 100 includes, for example, a projector, a display, a television and the like. A video data reception unit 101 receives video data from the outside of the video display apparatus 100, for example, a video transmission apparatus 110. As an interface for receiving the video data, general-purpose input interfaces, such as, for example, HDMI, SDI, or DisplayPort interface, or a LAN connected to a network can be used. A video display unit 102 displays the video data received at the video data reception unit 101 for a user. The video data to be displayed may be a still image or a moving image, and operation such as a fast-forward or a pause operation may be performed by the user. An image quality parameter reception unit 103 receives an image quality parameter which will be set for the video data received by the video data reception unit 101. Image quality parameters include parameters for improving visibility of videos such as sharpness and noise removal, in addition to basic attributes of colors, for example, hue, lightness, or saturation. An image quality parameter reflection unit 104 reflects an image quality parameter, which is received by the image quality parameter reception unit 103, on the video data. The video data is received by the video data reception unit 101 and is displayed on the video display unit 102.

The video transmission apparatus 110 transmits video data to the video display apparatus 100. A video data transmission unit 111 transmits the video data stored by the video transmission apparatus 110 to the outside, for example, the video display apparatus 100. An interface for transmitting the video data includes a configuration paired with, for example, the video data reception unit 101. An image quality parameter setting unit 112 allows the user to set an image quality parameter for the video data stored by the video transmission apparatus 110. Alternatively, the image quality parameter setting unit 112 acquires an image quality parameter. As an input unit for setting an image quality parameter, various operation devices such as, for example, a keyboard, a mouse, a digitizer, a touch panel, and a joystick can be used. In the present exemplary embodiment, arrangements of these devices are not limited. An image quality parameter generation unit 113 generates and stores an image quality parameter, based on the image quality parameter set by the image quality parameter setting unit 112. An image quality parameter transmission unit 114 transmits the setting information of the image quality parameter generated by the image quality parameter generation unit 113 according to the video data transmitted by the video data transmission unit 111, to the outside, for example, the video display apparatus 100. Accordingly, the image quality parameter generated by the image quality parameter generation unit 113 is used in an external apparatus, for example, the video display apparatus 100. A video display unit may be included in the video transmission apparatus 110, for example, as in a smartphone or a tablet PC carried by the user.

Figure 2:
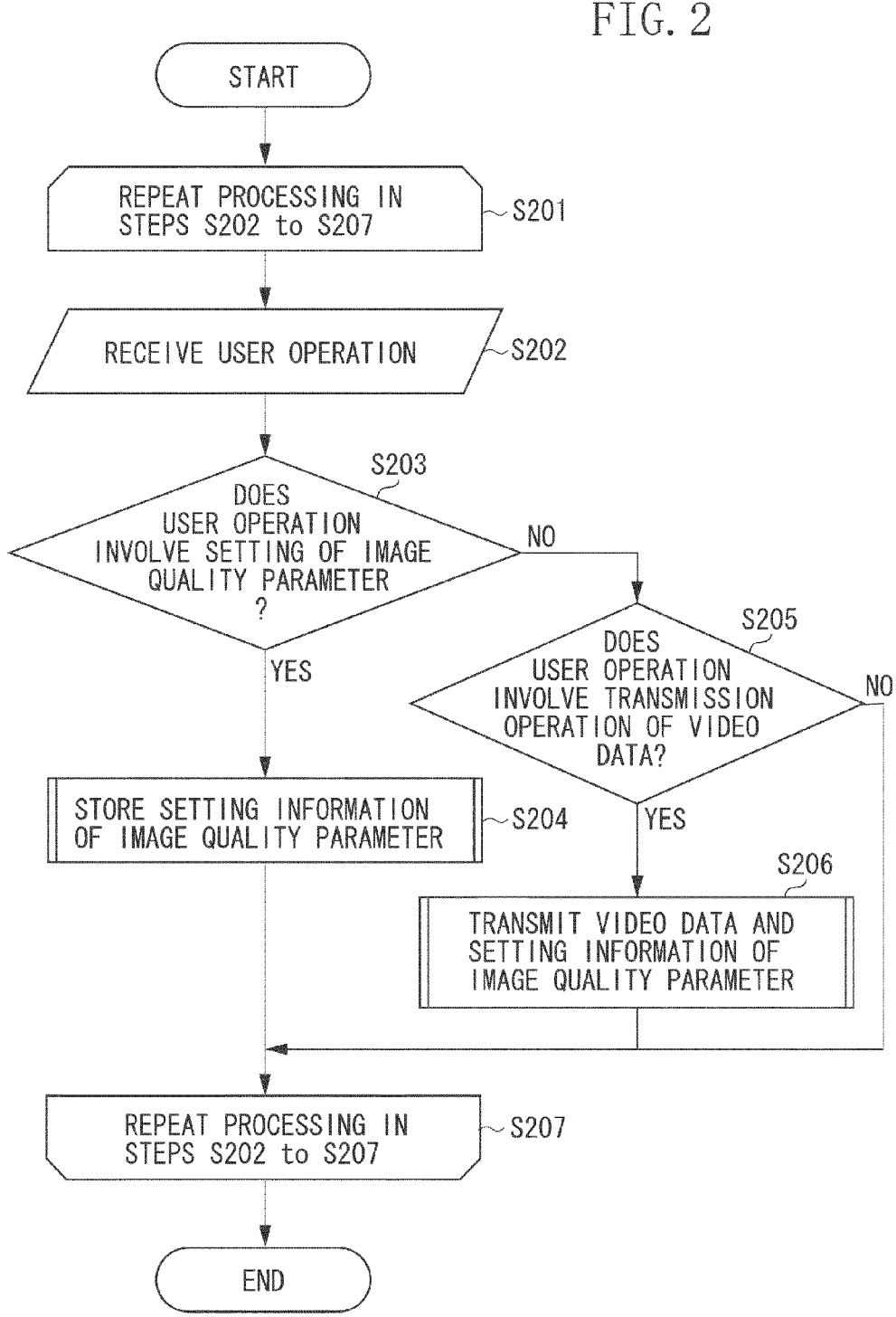
FIG. 2 is a flowchart illustrating processing of a video transmission apparatus according to a first exemplary embodiment 1 of the present invention.

FIG. 2 is a flowchart illustrating processing of the video transmission apparatus 110 in the first exemplary embodiment of the present invention. Hereinbelow, a multifunctional portable terminal (information terminal) such as a smartphone individually owned by a user is used as an example of the video transmission apparatus 110.

In step S201, the video transmission apparatus 110 repeats the subsequent processing from steps S202 to S207, while a system is being activated. In step S202, the video transmission apparatus 110 receives a user operation. A keyboard, a touch panel, or the like can be used as an input unit in the example of a multifunctional portable terminal, but arrangement of these input units is not limited in the present exemplary embodiment. The user operation received in the processing is versatile, which includes switching of target video data. In step S203, the video transmission apparatus 110 determines whether the user operation received in step S202 involves a setting of an image quality parameter. If it is determined that the user operation involves the setting of the image quality parameter (YES in step S203), the processing proceeds to step S204. If it is determined that the user operation does not involve the setting of the image quality parameter (NO in step S203), the processing proceeds to step S205. In step S204, the image quality parameter generation unit 113 stores the setting information of the image quality parameter. The details of the processing will be described below with reference to FIG. 3.

In step S205, the video transmission apparatus 110 determines whether the user operation received in step S202 involves a transmission operation of the video data. If it is determined that the user operation involves the transmission operation of the video data (YES in step S205), the processing proceeds to step S206. If it is determined that the user operation does not involve the transmission operation of the video data (NO in step S205), the processing proceeds to step S207 and the operation continues repeatedly. In step S206, the video transmission apparatus 110 transmits the video data and the setting information of the image quality parameter. The details of the processing will be described below with reference to FIG. 5.

Figure 3:
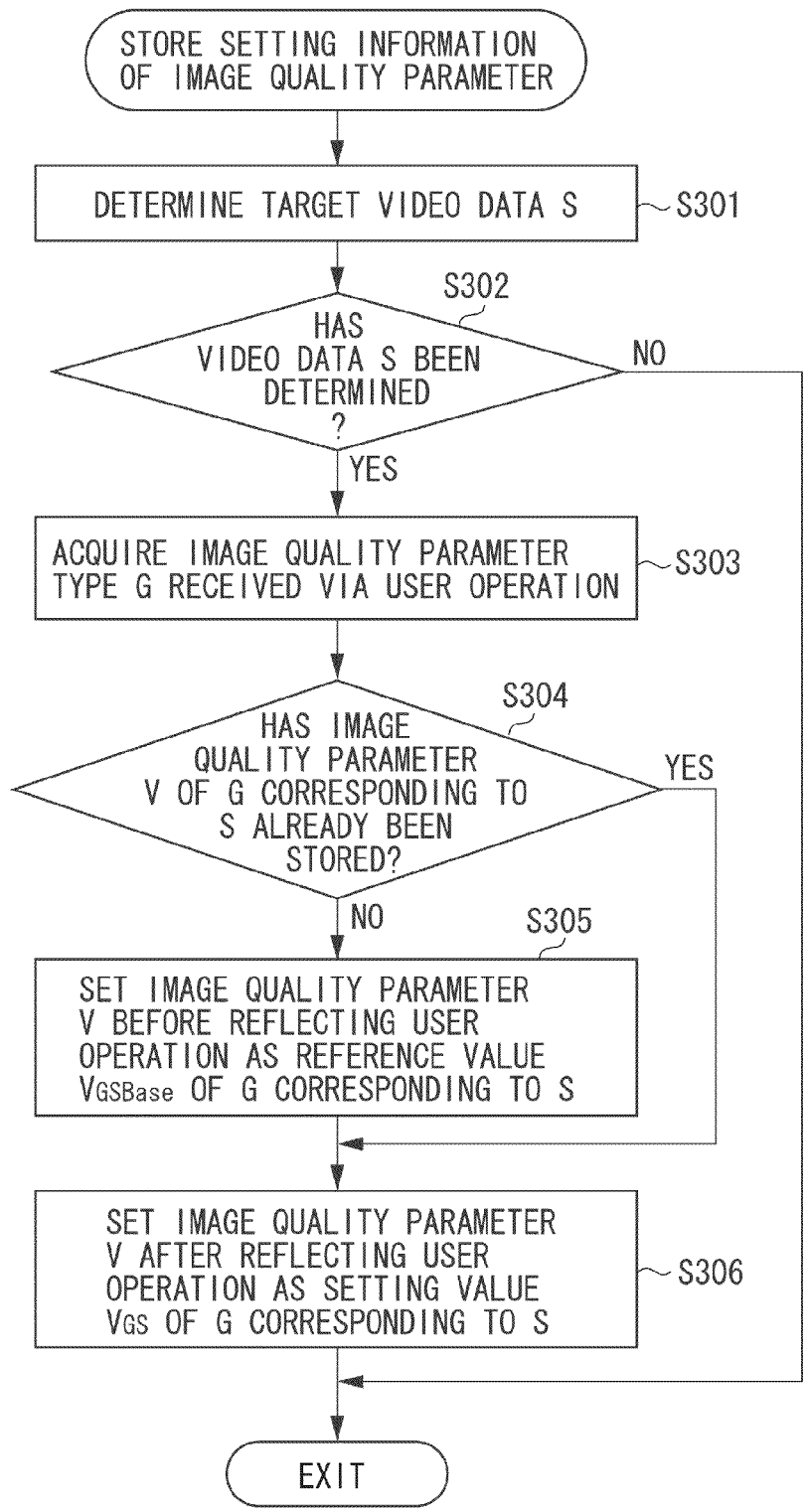
FIG. 3 is a flowchart illustrating the details of processing for storing setting information of an image quality parameter according to the first exemplary embodiment.

FIG. 3 is a flowchart illustrating the details of the processing in which the image quality parameter generation unit 113 in the first exemplary embodiment of the present invention stores the setting information of the image quality parameter, which corresponds to step S204 in FIG. 2.

In step S301 in FIG. 3, the image quality parameter generation unit 113 determine a target video data S for which an image quality parameter has been set by the image quality parameter setting unit 112. In a case where the video transmission apparatus including a display unit like a multifunctional portable terminal, the video data S may be determined on the assumption that a target video for which the image quality parameter has been set is a video currently being displayed. Further, in case of a video transmission apparatus that can display a plurality of pieces of video data on one screen in split display, the video data S on which an image quality parameter is to be reflected may be determined by specifying a focused screen. Furthermore, in case of a video transmission apparatus capable of designating a range within which the image quality parameter is reflected, the video data displayed within a range where the image quality parameter is reflected may be set as the target video data S. At any rate, the image quality parameter generation unit 113 identifies video data for which the image quality parameter is set to determine the video data S.

In step S302, it is determined whether the video data S has been determined in step S301. If it is determined that the video data S has been identified (YES in step S302), the processing proceeds to step S303. If it is determined that the video data S has not been identified (NO in step S302), the processing for storing the setting information of the image quality parameter ends. In step S303, the image quality parameter generation unit 113 acquires image quality parameter type G received via the user operation in step S203. In step S304, it is determined whether the image quality parameter V of the image quality parameter type G corresponding to the video data S has been already stored. If it is determined that the image quality parameter V has been already stored (YES in step S304), the processing proceeds to step S306. If it is determined that the image quality parameter V has not been stored (NO in step S304), the processing proceeds to step S305.

In step S305, the image quality parameter generation unit 113 sets an image quality parameter V before reflecting the user operation as the image quality parameter setting reference value $VGSB_{ase}$ of the image quality parameter type G corresponding to the video data S. Accordingly, information of the image quality parameter set before setting the relevant video data S is stored in the image quality parameter generation unit 113. In step S306, the image quality parameter generation unit 113 sets an image quality parameter V after reflecting the user operation as a setting value VGS of the image quality parameter type G corresponding to the video data S.

FIG. 4 illustrates an example of image quality parameters stored in the image quality parameter generation unit 113, as a result of having executed the processing for storing the setting information of the image quality parameter illustrated in FIG. 3. In FIG. 4, image quality parameters 400 corresponding to the video data S are stored in the image quality parameter generation unit 113.

A column 401 represents an image quality parameter type G. The image quality parameter type G includes parameters for improving visibility of videos such as sharpness or noise removal, in addition to basic attributes of colors such as for example, hue, lightness, or saturation. The name of the image quality parameter type G may be stored after converting the name inherent to the video transmission apparatus 110 into a more generic expression. A column 402 lists the setting value VGS of the image quality parameter, which is stored in the image quality parameter generation unit 113, as a result of having executed the processing in step S306. A column 403 lists the reference value $VGSB_{ase}$ of the image quality parameter setting, which is stored in the image quality parameter generation unit 113 as a result of having executed the processing in step S305. For example, in the example of a row 404, there are stored 55 as a setting value VGS of the image quality parameter, and 50 as a setting reference value $VGSB_{ase}$ of the image quality parameter, corresponding to an image quality parameter type G of hue_red. The hue_red illustrated as an image quality parameter type is an image quality parameter type which enables hue to be adjusted by a single color such as red, green, or blue, and has been frequently used in recent video display apparatuses.

Figure 5:
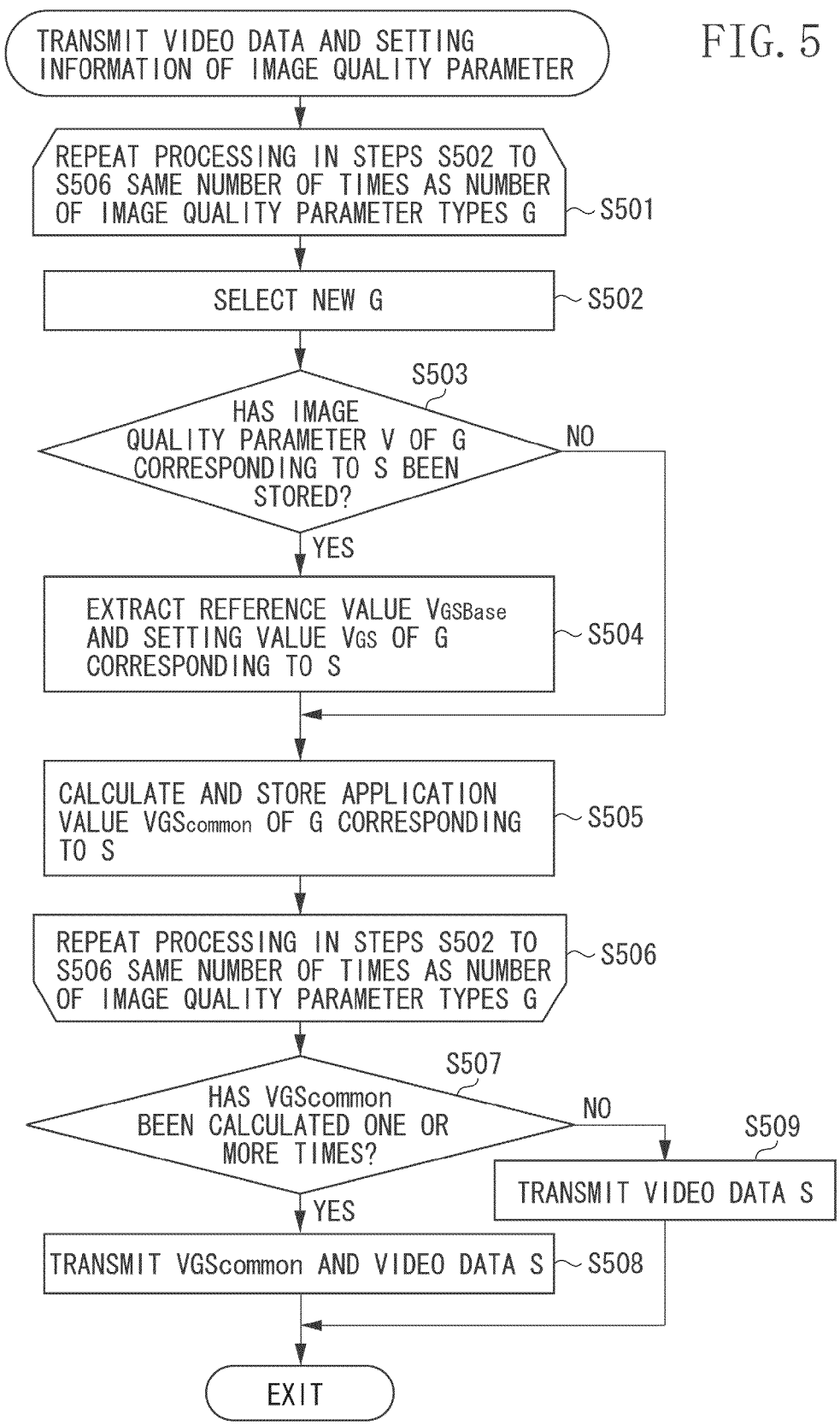
FIG. 5 is a flowchart illustrating the details of processing for transmitting video data and setting information of image quality parameters according to the first exemplary embodiment.

FIG. 5 is a flowchart illustrating the details of the processing performed by the image quality parameter transmission unit 114 that transmits video data and the setting information of the image quality parameter, and this corresponds to step S206 in FIG. 2. In step S501 in FIG. 5, the image quality parameter transmission unit 114 repeats the subsequent processing from step S502 to step S506 the same number of times as the number of the image quality parameter types G. The number of repetitions is equivalent to the number of rows of the image quality parameters 400 for the video data S stored in the image quality parameter generation unit 113.

In step S502, the image quality parameter transmission unit 114 selects a new image quality parameter type G. Here, the subsequent processing will be described, assuming that the "hue_red" corresponding to the row 404 is selected. In step S503, the image quality parameter transmission unit 114 determines whether an image quality parameter V of the image quality parameter type G corresponding to the video data S has been stored. If it is determined that the image quality parameter V has been already stored (YES in step S503), the processing proceeds to step S504. If it is determined the image quality parameter V of G corresponding to S has not been stored (NO in step S503), the processing proceeds to step S505. In step S504, the image quality parameter transmission unit 114 extracts an image quality parameter setting reference value $VGSB_{ase}$ and a setting value VGS of the image quality parameter type G corresponding to the video data S. In the example of the row 404, 50 as a $VGSB_{ase}$, 55 as a VGS are extracted. In step S505, the image quality parameter transmission unit 114 calculates and stores an application value $VGS_{common}$ of the image quality parameter type G corresponding to the video data S. As a calculation result of the $VGS_{common}$ in this case, a difference with respect to, for example, the image quality parameter setting reference value $VGSB_{ase}$ may be expressed in percentage. That is, a percentage indicating an increase or a decrease from the reference value is expressed. More specifically, as illustrated in FIG. 6, the image quality parameter transmission unit 114 stores in advance a minimum value and a maximum value that can be set on the video transmission apparatus corresponding to each of the image quality parameter types G, and calculates a percentage of the setting to settable maximum value or minimum value. As an example, the equation (a) for linearly calculating an application value $VGS_{common}$ of the image quality parameter type G corresponding to the video data S, with respect to the setting value VGS of the image quality parameter type corresponding to the video data S is given as follows:

$$VGS_{common} = (VGS - VGSB_{ase})/(V_{max} - V_{min}) * 100 \quad (a)$$

For example, an equation that can be substituted for the above-described equation may be separately defined, or non-linear table values for each image quality parameter may be stored, and these values may be used. FIG. 7 illustrates calculated application value $VGS_{common}$ of the image quality parameter, as a result of having applied the equation (a) to the setting value of each image quality parameter illustrated in FIG. 4. For example, like sharpness indicated in a row 405, the setting value VGS of the image quality parameter coincides with the reference value $VGSB_{ase}$ of the image quality parameter, that is, in a case where no change is made by the user, the information concerning the image quality parameter type may be deleted.

In step S507, it is determined whether an application value $VGS_{common}$ of the image quality parameter has been calculated one or more times. If it is determined that the application value $VGS_{common}$ has been calculated one or more times (YES in step S507), the processing proceeds to step S508. If it is determined that the application value $VGS_{common}$ has not been calculated even one time (NO in step S507), the processing proceeds to step S509. In step S508, the image quality parameter transmission unit 114 transmits an application value $VGS_{common}$ of the image quality parameter as the setting information of the image quality parameter to the image quality parameter reception unit 103 and transmits the video data S to the video data reception unit 101. As a method for transmission, transmission via the network using the LAN, transmission in compliance with an input/output standard such as High Definition Multimedia Interface-Consumer Electronics Control (HDMI-CEC), transmission as header information of the video data, and transmission by other units may be performed. Further, as a different example of a reflection unit of the image quality parameter setting information, a method for reflecting the setting information of the image quality parameter on the video data within the video transmission apparatus 110, and then transmitting the video data, with the image quality parameter information already reflected, to the video display apparatus 100 may be performed.

FIG. 8 illustrates information transmission example in a hyper text markup language (HTML) format, as an example of a transmission method of video data. FIG. 8 illustrates the entire HTML format 800 to be transmitted. A row 801 identifies an image quality parameter type G. A row 802 is the setting information of the image quality parameter corresponding to the image quality parameter type G identified in the row 801. In step S509, the image quality parameter transmission unit 114 transmits only the video data S to the video display apparatus 100, on the grounds that the application value $VGS_{common}$ of the image quality parameter has not been calculated.

Figure 9:
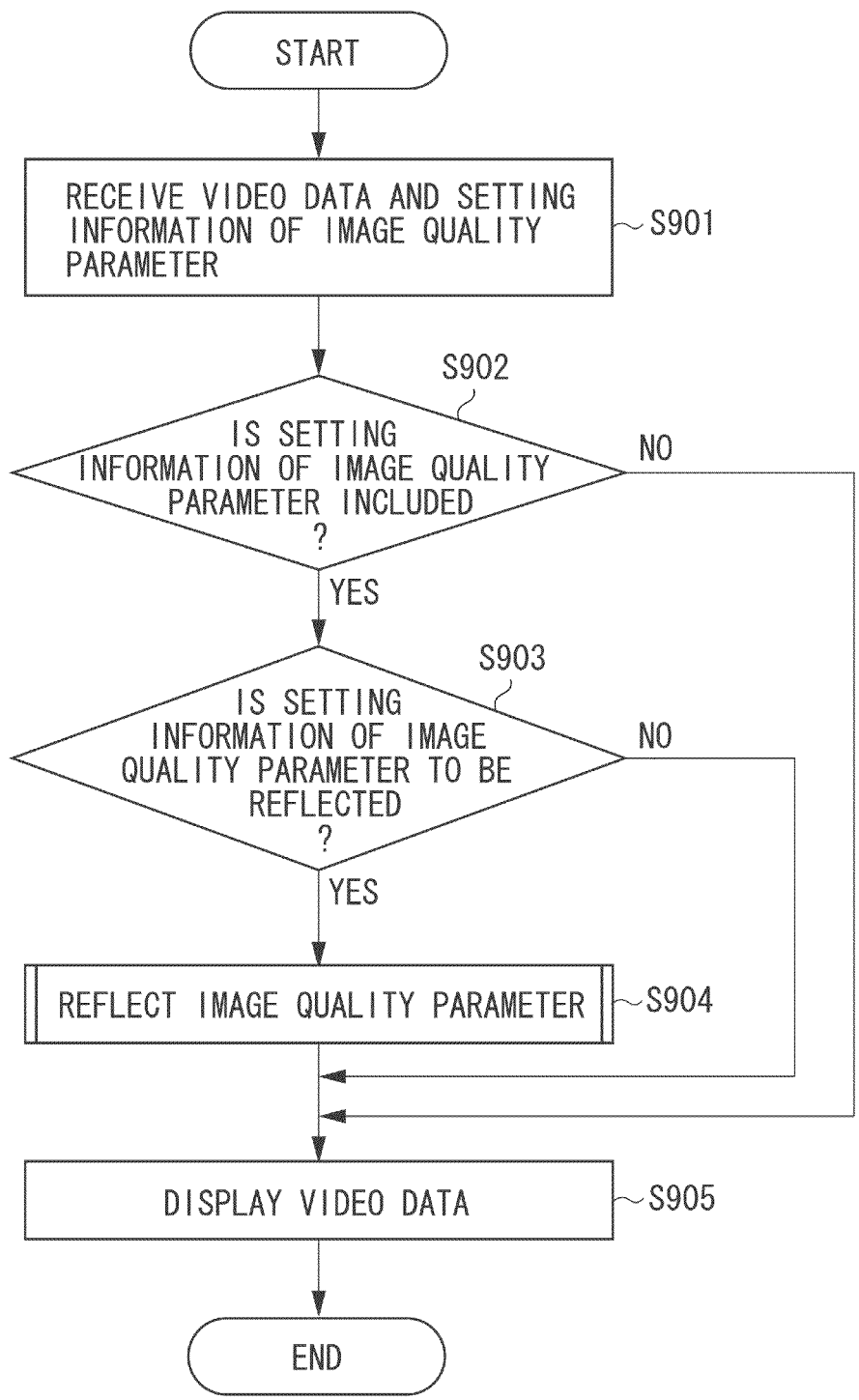
FIG. 9 is a flowchart illustrating processing of the video display apparatus according to the first exemplary embodiment.

FIG. 9 is a flowchart illustrating processing of the video display apparatus 100 in the first exemplary embodiment of the present invention. Hereinbelow, a projector is used as an example of the video display apparatus 100.

In step S901, the video display apparatus 100 receives the video data and setting information of the image quality parameter. The video data received in step S901 is the video data S transmitted by the video data transmission unit 111 in step S206, and the setting information of the image quality parameter is the application value $VGS_{common}$ of the image quality parameter transmitted by the image quality parameter transmission unit 114 in step S206.

Figure 10:
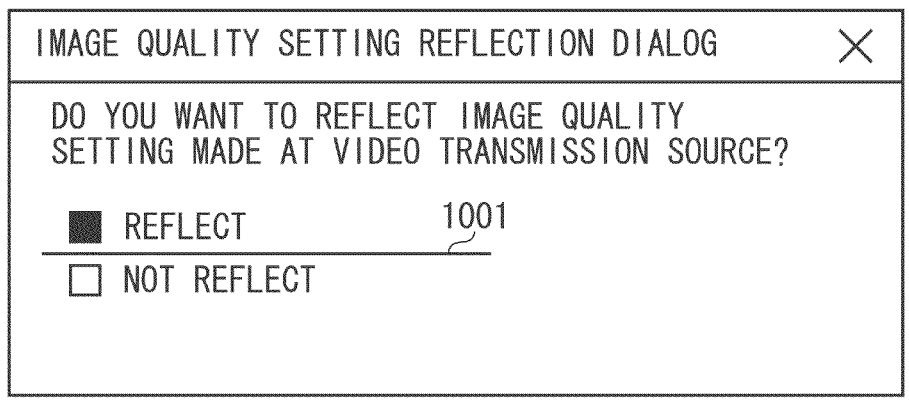
FIG. 10 illustrates an example of a dialog for setting whether image quality parameter information is to be reflected according to the first exemplary embodiment.

In step S902, it is determines whether the setting information of the image quality parameter is included. If it is determined that the setting information of the image quality parameter is included (YES in step S902), the processing proceeds to step S903. If it is determined that the setting information of the image quality parameter is not included (NO in step S902), the processing proceeds to step S905. In step S903, it is determined whether the setting information of the image quality parameter is to be reflected. If it is determined that the setting information of the image quality parameter is to be reflected (YES in step S903), the processing proceeds to step S904. If it is determined that the setting information of the image quality parameters is not to be reflected (NO in step S903), the processing proceeds to step S905. Step S903 of the determination processing can be omitted, and in that case, the processing proceeds to step S904. Alternatively, determination of step S903 may be executed using a condition preset in the video display apparatus 100, or the image quality setting reflection dialog illustrated in FIG. 10 may be displayed on the display screen of the video display apparatus 100 so that determination by the user may be received. In the example in FIG. 10, since "reflect" display on a row 1001 is selected, the processing proceeds to step S904.

In step S904, the image quality parameter reflection unit 104 reflects the image quality parameter. In step S905, the image display unit 102 displays the video data.

Figure 11:
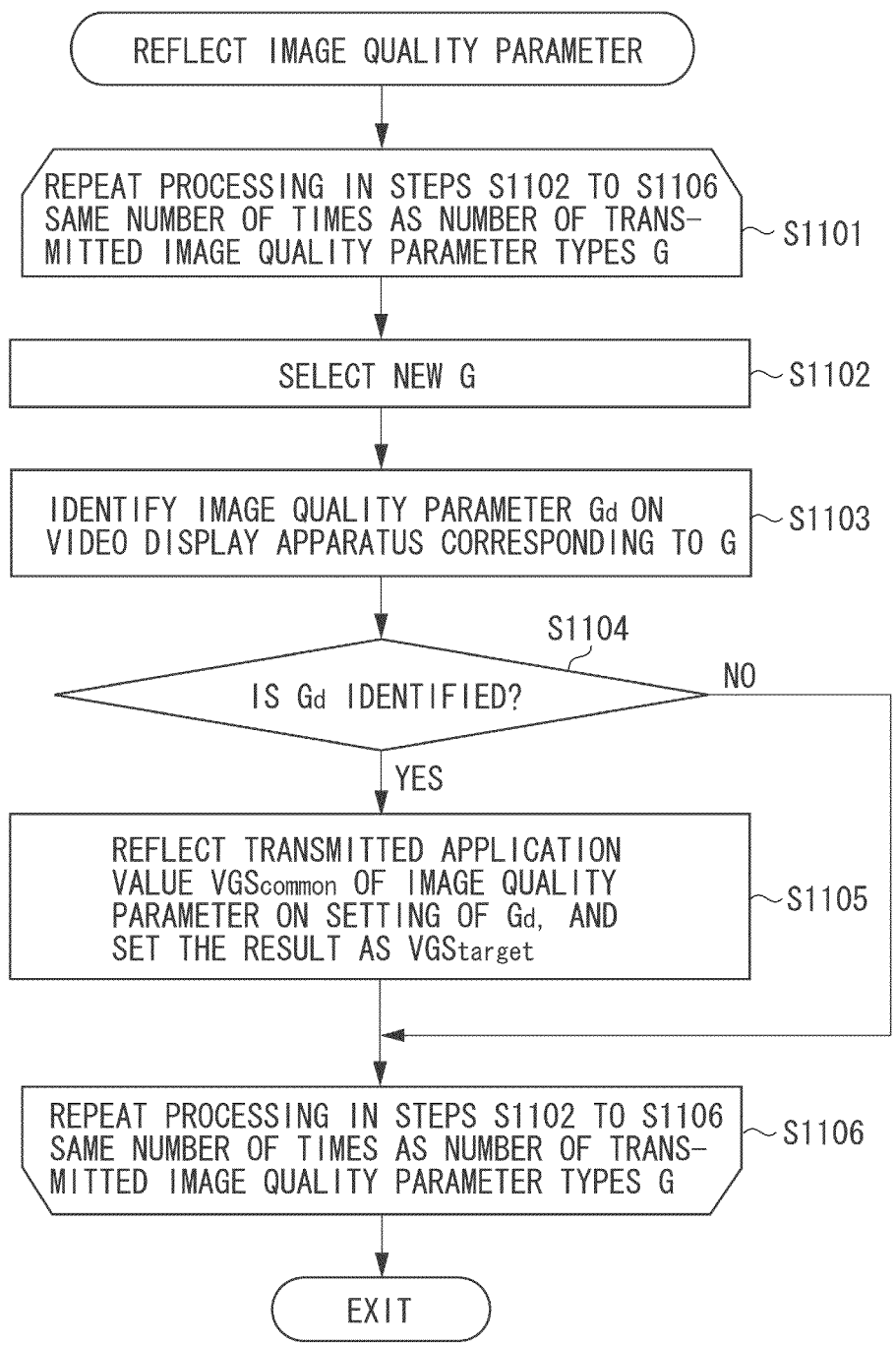
FIG. 11 is a flowchart illustrating the details of processing for reflecting image quality parameters according to the first exemplary embodiment.

FIG. 11 is a flowchart illustrating the details of the processing in which the image quality parameter reflection unit 104 in the first exemplary embodiment of the present invention reflects the setting information of the image quality parameter, and this corresponds to step S904 in FIG. 9. In step S1101 in FIG. 11, the image quality parameter reflection unit 104 repeats the subsequent processing in steps S1102 to S1106 the same number of times as the number of the transmitted image quality parameter types G.

In step S1102, the image quality parameter reflection unit 104 selects a new image quality parameter type G. In step S1103, the image quality parameter reflection unit 104 identifies an image quality parameter $G_d$, on the video display apparatus, corresponding to the image quality parameter type G. For example, the image quality parameter reflection unit 104 executes correspondence between the image quality parameter type $G_d$ on the video display apparatus and the transmitted image quality parameter type G by making comparisons of character strings. In step S1104, it is determined whether the image quality parameter type $G_d$ on the video display apparatus has been identified. If it is determined that the image quality parameter type $G_d$ on the video display apparatus has been identified (YES in step S1104), the processing proceeds to step S1105. If it is determined that the image quality parameter type $G_d$ on the video display apparatus has not been identified (NO in step S1104), the processing proceeds to step S1106, and the processing continues repeatedly.

In step S1105, the image quality parameter reflection unit 104 reflects the transmitted application value $VGS_{common}$ of the image quality parameter G on the setting of the image quality parameter type $G_d$ on the video display apparatus. As a reflection method, for example, there is a method of having previously stored minimum values and maximum values, on the video display apparatus, corresponding to the respective image quality parameter types $G_d$ on the video display apparatus, and mapping the $VGS_{common}$ to a value within the range of the minimum value and maximum value. As an example, the equation (b) that linearly reflects the application value $VGS_{common}$ of the image quality parameter type G within the range of the minimum value and maximum value is given as follows:

$$VGS_{target}=V_{base}+(VGS_{common})*(V_{max}-V_{min})/200 \qquad (b)$$

Figure 13:
FIG. 13 illustrates a storage example of image quality parameters to be applied to the video display apparatus according to the first exemplary embodiment.

FIG. 12 illustrates an example of the information of the video display apparatus 100 to be stored in the image quality parameter reflection unit 104 in order to apply the equation (b). Further, FIG. 13 illustrates values of $VGS_{target}$ calculated by applying the equation (b). By using a minimum value −20, a maximum value 20, and a reference value 0 of the image quality parameter indicated on the row 1201, an application value 2 of hue_red indicated in a row 1301 is calculated.

As described above, with the video transmission and display apparatuses in the present exemplary embodiment, the image quality parameter information set by the video transmission apparatus 110 is transmitted to the video display apparatus 100. Accordingly, it is not necessary to set an image quality via a remote controller or a setting panel provided on the video display apparatus 100, and it becomes possible to display the video data with the image quality setting similar to the setting in the video transmission apparatus.

Hereinbelow, a second exemplary embodiment of the present invention will be described, focusing on differences from the first exemplary embodiment. However, the technical scope of the present invention is not limited to the exemplary embodiment.

Figure 14:
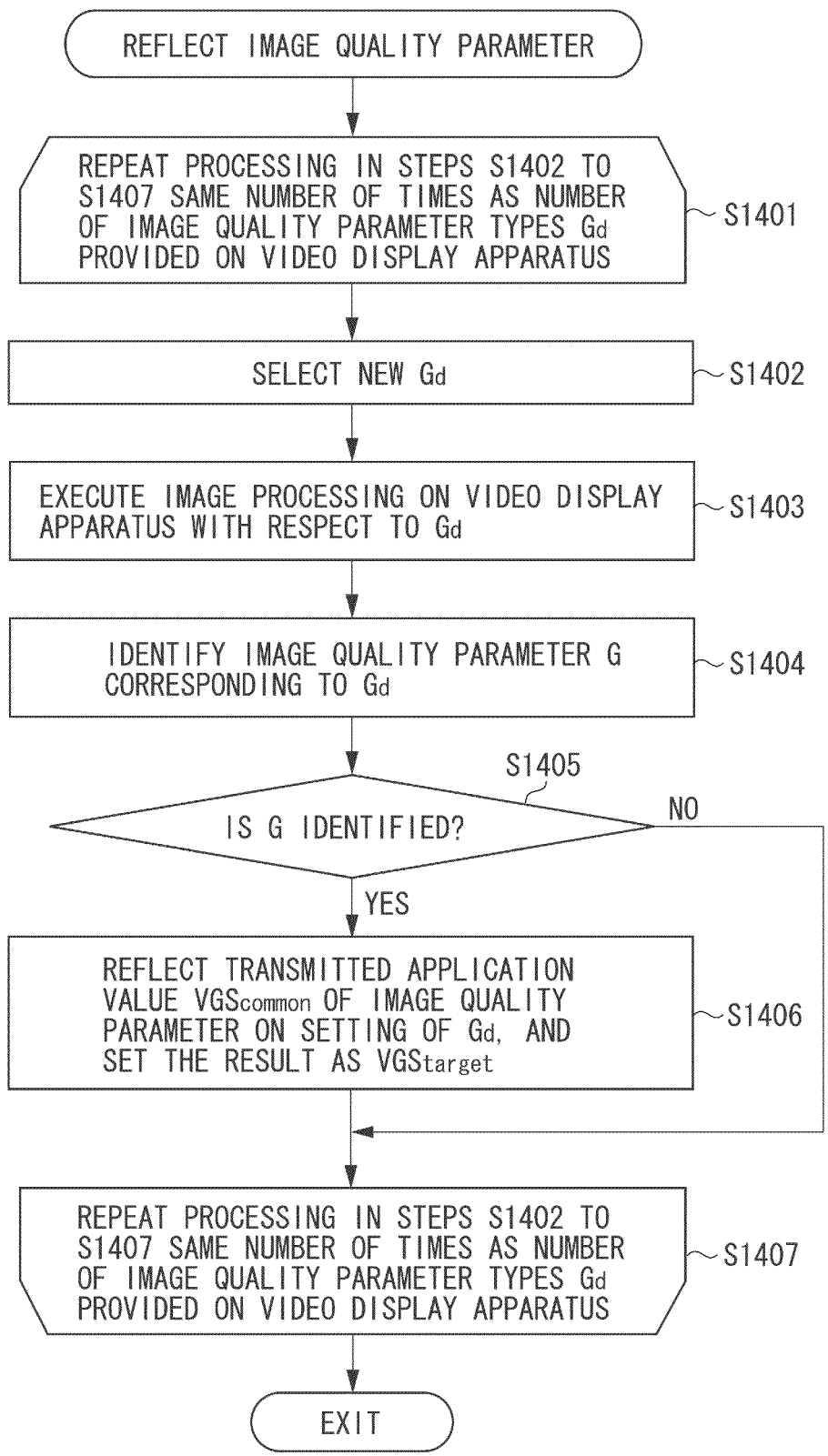
FIG. 14 is a flowchart illustrating the details of processing for reflecting image quality parameters according to a second exemplary embodiment of the present invention.

FIG. 14 is a flowchart illustrating the details of the processing in which the image quality parameter reflection unit 104 in the second exemplary embodiment of the present invention reflects the setting information of the image quality parameter, and this corresponds to step S904 in FIG. 9. In step S1401 in FIG. 14, the image quality parameter reflection unit 104 repeats the subsequent processing from steps S1402 to S1407 the same number of times as the number of the image quality parameter types $G_d$ provided on the video display apparatus. In step S1402, the image quality parameter reflection unit 104 selects a new image quality parameter type $G_d$. In step S1403, the image quality parameter reflection unit 104 executes image processing on the video display apparatus 100 with respect to the image quality parameter type $G_d$. The video display apparatuses each have inherent image processing. In the example of the projector, in addition to image processing common to many video display devices, processing for changing hue to match a wall color or for changing lightness to match an environmental light, for example, are performed. Further, the result is stored in the image quality parameter reflection unit 104 as an image quality parameter reflection reference value $V_{base}E_x$.

In step S1404, the image quality parameter reflection unit 104 identifies the transmitted image quality parameter G corresponding to the image quality parameter type $G_d$ on the video display apparatus 100. The image quality parameter reflection unit 104 identifies the image quality parameter type $G_d$ on the video display apparatus and the transmitted image quality parameter type G, by making comparisons of character strings, for example. In step S1405, it is determined whether the image quality parameter type G has been identified. If it is determined that the image quality parameter type G has been identified (YES in step S1405), the processing proceeds to step S1406. If it is determined that the image quality parameter type G has not been identified (NO in step S1405), the processing proceeds to step S1407, and the processing continues repeatedly.

In step S1406, the image quality parameter reflection unit 104 reflects the transmitted application value $VGS_{common}$ of the image quality parameter on the setting of the image quality parameter type $G_d$. As a reflection method, for example, minimum values and maximum values of the video display apparatus with respect to respective image quality parameter types G are stored in advance, and the $VGS_{common}$ is mapped to a value obtained when the parameter is changed within this range. At that time, the $V_{base}E_x$ stored in the image quality parameter reflection unit 104 in step S1403 is used as a basic value. The equation (c) linearly calculated is given as follows:

$$VGS_{target}=V_{base}E_x+(VGS_{common})*(V_{max}-V_{min})/200 \qquad (c).$$

As described above, according to the video transmission and display apparatuses in the present exemplary embodiment, the image quality parameter information set by the video transmission apparatus 110 is transmitted to the video display apparatus 100. Accordingly, without setting an image quality via a remote controller or a setting panel provided on the video display apparatus 100, it becomes possible to display the video data where the image quality parameter set at the video transmission apparatus side is reflected on the image quality setting at the video display apparatus side.

The respective processing units illustrated in FIG. 1 have been described in the above-described exemplary embodiments, assuming that they are configured by hardware. However, the processing performed by the respective processing units illustrated in FIG. 1 (except for the video display unit) may be configured with computer programs.

Figure 15:
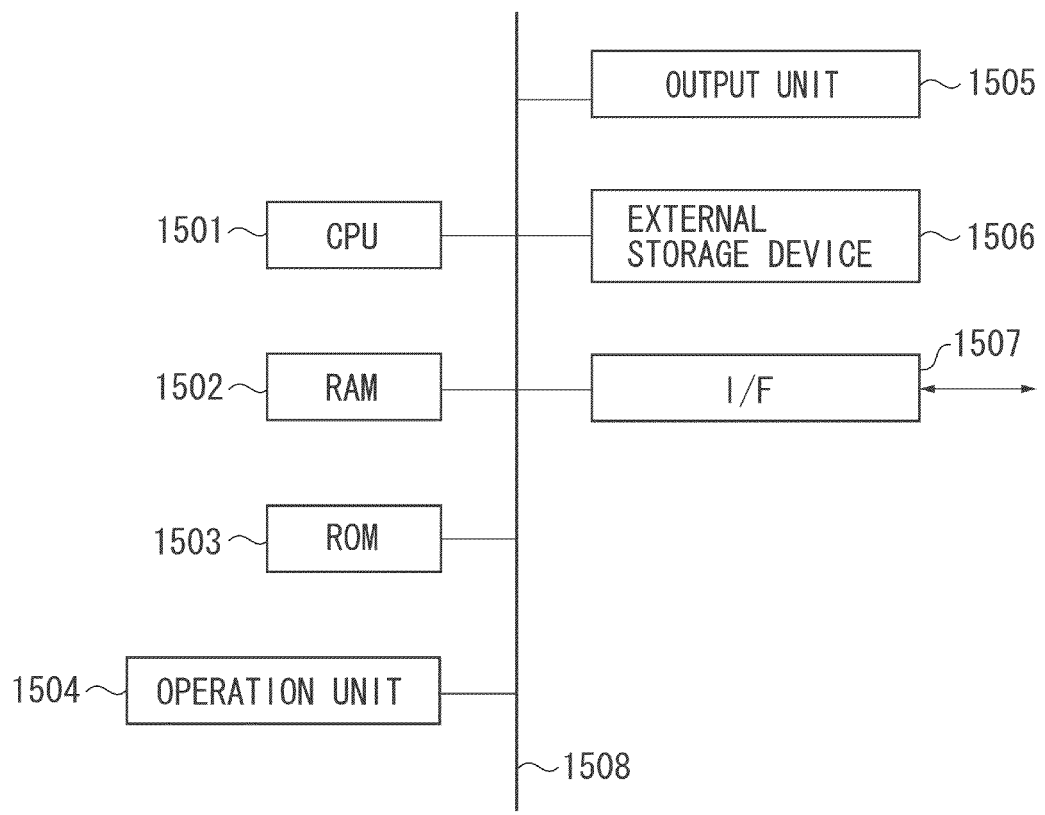
FIG. 15 is a block diagram illustrating a hardware configuration example of a computer applicable to the video display apparatus, and the video transmission apparatus according to the exemplary embodiments of the present invention.

FIG. 15 is a block diagram illustrating a configuration example of hardware of a computer that can be applied to the video display apparatus and the video transmission apparatus according to the above-described respective exemplary embodiments.

A central processing unit (CPU) 1501 performs control of the entire computer, using computer programs or data stored in a random access memory (RAM) 1502 or a read only memory (ROM) 1503, as well as executing the above-described respective processing which are assumed to be performed by the image processing apparatus according to the above-described respective exemplary embodiments. That is, the CPU 1501 acts as respective processing units illustrated in FIG. 1.

The RAM 1502 includes an area for temporarily storing computer programs or data loaded from an external storage device 1506 or data acquired from external devices via an interface (I/F) 1507. Furthermore, the RAM 1502 includes a work area used when the CPU 1501 executes various types of processing. That is, the RAM 1502 can be assigned, for example, as a frame memory, and can provide other various types of areas when appropriate.

In the ROM 1503, setting data of the computer or a boot program is stored. The operation unit 1504 is configured by a keyboard and a mouse and the like, and can input various types of instructions, via an operation performed by the user of the computer, to the CPU 1501.

The external storage device 1506 is a large-volume information storage device, which is represented by a hard disk drive device. An operating system (OS) and a computer program for causing the CPU 1501 to realize the functions of respective units illustrated in FIG. 1 are stored in the external storage device 1506. Furthermore, respective image data as a processing target may be stored in the external storage device 1506.

The computer programs or data stored in the external storage device 1506 are loaded into the RAM 1502 as appropriate according to the control by the CPU 1501, and become processing targets to be processed by the CPU 1501. A network such as a LAN or the internet and other devices can be connected to the computer via the I/F 1507, and the computer can acquire or send out various pieces of information via the I/F 1507. A bus 1508 connects respective units to each other.

For the operations with the above-described configurations, the CPU 1501 principally performs control of the operations described above using the flowcharts.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-138387 filed Jun. 20, 2012, which is hereby incorporated by reference herein in its entirety.

What is claimed is:

1. A video transmission apparatus comprising:
   a video data transmission unit configured to transmit video data to an external apparatus;
   a determination unit configured to determine whether an image quality parameter for an image quality parameter type is stored or not, the image quality parameter being used for a display at the video transmission apparatus;
   an image quality parameter acquisition unit configured to acquire an image quality parameter if the image quality parameter for the image quality parameter type is stored;
   an image quality parameter generation unit configured to generate, by adjusting the acquired image quality parameter acquired by the image quality parameter acquisition unit, image quality parameter information for a display of the transmitted video data at the external apparatus; and
   an image quality parameter transmission unit configured to transmit the image quality parameter information generated by the image quality parameter generation unit to the external apparatus.

2. The video transmission apparatus according to claim 1, wherein the image quality parameter generation unit stores a reference value of an image quality parameter, and generates, from the reference value and the image quality parameter acquired by the image quality parameter acquisition unit, image quality parameter information to be used in the external apparatus.

3. The video transmission apparatus according to claim 2, wherein the image quality parameter includes a plurality of types, and each image quality parameter includes a reference value.

4. The video transmission apparatus according to claim 2, wherein the image quality parameter generation unit generates an application value of the image quality parameter based on the reference value.

5. The video transmission apparatus according to claim 4, wherein the application value of the image quality parameter is represented by a percentage indicating an increase or a decrease from the reference value.

6. The video transmission apparatus according to claim 4, wherein an application value $VGS_{common}$ of the image quality parameter is expressed as $VGS_{common} = (VGS - VGSB_{ase})/(V_{max} - V_{min}) * 100$, where an image quality parameter acquired by the image quality parameter acquisition unit is VGS, the reference value is $VGSB_{ase}$, a settable maximum value of the image quality parameter is $V_{max}$, and a settable minimum value of the image quality parameter is $V_{min}$.

7. A video display apparatus comprising:
   a video data reception unit configured to receive video data from an external apparatus;
   a determination unit configured to determine if an image quality parameter for an image quality parameter type is received for displaying the received video data from the external apparatus;
   an image quality parameter generation unit configured to generate, from the image quality parameter information received by the image quality parameter reception unit, an image quality parameter for displaying the video data if the image quality parameter information for the image quality parameter type is received; and
   a video display unit configured to display the video data using the image quality parameter generated by the image quality parameter generation unit wherein the video data is displayed without adjustment for the image quality parameter type if the image quality parameter information is not received.

8. The video display apparatus according to claim 7, wherein the image quality parameter generation unit generates an image quality parameter for displaying the video data, based on the image quality parameter information received by the image quality parameter reception unit and a reference value of the image quality parameter of the video data.

9. The video display apparatus according to claim 8, wherein the image quality parameter includes a plurality of types, and each image quality parameter includes a reference value.

10. The video display apparatus according to claim 8, wherein the image quality parameter information indicates an application value of the image quality parameter generated based on the reference value.

11. The video display apparatus according to claim 10, wherein the application value of the image quality parameter is represented by a percentage indicating an increase or a decrease from the reference value.

12. The video display apparatus according to claim 7, wherein the image quality parameter generation unit determines whether the image quality parameter information is to be used.

13. A method for transmitting a video in a video transmission unit that transmits video data to an external apparatus, the method comprising:
   transmitting video data to an external apparatus;
   determining whether an image quality parameter for an image quality parameter type is stored or not, the image quality parameter being used for a display at the video transmission apparatus;
   acquiring an image quality parameter to be used for display of the video data if the image quality parameter for the image quality parameter type is stored;
   generating, by adjusting the acquired image quality parameter, image quality parameter information for a display of the transmitted video data at the external apparatus; and transmitting the generated image quality parameter information to the external apparatus.

14. A method for displaying a video in a video display apparatus that displays video data, the method comprising:

receiving video data from an external apparatus;

determining if an image quality parameter for an image quality parameter type is received for displaying the received video data from the external apparatus;

generating, from the received image quality parameter information, an image quality parameter for displaying the video data if the image quality parameter information for the image quality parameter type is received; and displaying the video data using the generated image quality parameter wherein the video data is displayed without adjustment for the image quality parameter type if the image quality parameter information is not received.

15. A non-transitory computer-readable storage medium storing a program that causes a computer to function as the video transmission apparatus according to claim 1.

16. A non-transitory computer-readable storage medium storing a program that causes a computer to function as the video display apparatus according to claim 7.

* * * * *